US011805409B2

(12) United States Patent
Chen et al.

(10) Patent No.: US 11,805,409 B2
(45) Date of Patent: *Oct. 31, 2023

(54) SYSTEM AND METHOD FOR DERIVING A PROFILE FOR A TARGET ENDPOINT DEVICE

(71) Applicant: Verizon Patent and Licensing Inc., Basking Ridge, NJ (US)

(72) Inventors: Zhengfang Chen, Millburn, NJ (US); Taussif Khan, Martinsville, NJ (US); Manuel Enrique Caceres, Basking Ridge, NJ (US); Warren Hojilla Uy, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/805,089

(22) Filed: Jun. 2, 2022

(65) Prior Publication Data
US 2022/0295273 A1   Sep. 15, 2022

Related U.S. Application Data

(63) Continuation of application No. 16/405,826, filed on May 7, 2019, now Pat. No. 11,375,367.

(51) Int. Cl.
*H04L 9/08* (2006.01)
*H04W 12/0431* (2021.01)
(Continued)

(52) U.S. Cl.
CPC ....... *H04W 12/0431* (2021.01); *H04L 9/0819* (2013.01); *H04L 9/30* (2013.01);
(Continued)

(58) Field of Classification Search
CPC ... H04L 9/0816; H04L 9/0819; H04L 9/0825; H04L 9/0838; H04L 9/0861;
(Continued)

(56) References Cited

U.S. PATENT DOCUMENTS 5,539,822 A * 7/1996 Lett .................. G06Q 20/401
                                          348/E7.024
8,880,027 B1 * 11/2014 Darringer .............. H04M 1/67
                                          455/410

(Continued)

OTHER PUBLICATIONS

Anwar, et al., "Forensic SIM Card Cloning Using Authentication Algorithm", [Online], Jun. 2016 [Retrieved: Feb. 12, 2022], Int. J. of Electronics and Information Engineering, vol. 4, No. 2, pp. 71-81 (Year: 2016). Retrieved from: < https://www.researchgate.net/profile/Imam-Riadi-2/publication/303698192_Forensic_SIM_Card_Cloning_Using_Authentication_Algorithm/links/574e564708aec988526bc99a/Forensic-SIM-Card-Cloning-Using-Authentication-Algorithm.pdf >.
(Continued)

*Primary Examiner* — Eric W Shepperd

(57) ABSTRACT

A device may obtain, from a pool of subscription identifiers allocated for sharing, a subscription identifier for a target device to be onboarded onto a wireless network. The device may generate a derived subscriber identification module (SIM) profile that includes the subscription identifier and a derived set of credentials. The derived set of credentials may be based on an existing set of credentials associated with the device. The device may cause the derived SIM profile to be provided to the target device to enable the target device to obtain access to the wireless network.

20 Claims, 8 Drawing Sheets

(51) Int. Cl.
*H04W 12/06* (2021.01)
*H04L 9/32* (2006.01)
*H04L 9/30* (2006.01)
*H04W 12/43* (2021.01)

(52) U.S. Cl.
CPC .......... *H04L 9/3271* (2013.01); *H04W 12/06* (2013.01); *H04W 12/43* (2021.01)

(58) Field of Classification Search
CPC . H04L 9/0869; H04L 9/3271; H04L 63/0853; H04L 63/102; H04W 12/047; H04W 12/06; H04W 12/43; H04W 12/72
See application file for complete search history.

(56) References Cited

U.S. PATENT DOCUMENTS

| | | | |
|---|---|---|---|
| 9,531,831 B1 | 12/2016 | Cuadrat et al. | |
| 9,760,726 B2 | 9/2017 | Berard et al. | |
| 10,187,784 B1 | 1/2019 | Chen et al. | |
| 10,334,428 B1 | 6/2019 | Chen et al. | |
| 10,448,251 B1* | 10/2019 | Maria | H04W 12/06 |
| 10,498,739 B2* | 12/2019 | Lasser | G06F 21/31 |
| 2005/0282584 A1* | 12/2005 | Faisy | H04W 12/06 |
| | | | 455/558 |
| 2007/0004457 A1 | 1/2007 | Han | |
| 2007/0208937 A1 | 9/2007 | Cam-Winget et al. | |
| 2008/0081611 A1 | 4/2008 | Hoyt et al. | |
| 2008/0092212 A1* | 4/2008 | Patel | H04L 67/306 |
| | | | 709/224 |
| 2009/0217364 A1* | 8/2009 | Salmela | H04W 12/068 |
| | | | 726/6 |
| 2011/0099384 A1* | 4/2011 | Grange | H04L 9/3234 |
| | | | 713/184 |
| 2011/0247062 A1* | 10/2011 | Zon | G06Q 20/4018 |
| | | | 726/6 |
| 2012/0116886 A1* | 5/2012 | Manku | H04L 63/18 |
| | | | 705/14.64 |
| 2013/0227656 A1* | 8/2013 | Holtmanns | H04L 63/0892 |
| | | | 726/4 |
| 2013/0347025 A1* | 12/2013 | Prakash | H04N 21/25875 |
| | | | 725/25 |
| 2015/0004934 A1 | 1/2015 | Qian et al. | |
| 2015/0031356 A1* | 1/2015 | Gupta | H04W 8/02 |
| | | | 455/433 |
| 2015/0304506 A1 | 10/2015 | Zhu et al. | |
| 2016/0020802 A1 | 1/2016 | Lee et al. | |
| 2016/0050678 A1* | 2/2016 | Sherman | H04L 5/0091 |
| | | | 370/329 |
| 2016/0088467 A1 | 3/2016 | Reddem et al. | |
| 2016/0112389 A1* | 4/2016 | Bortolamiol | H04L 63/0823 |
| | | | 726/6 |
| 2016/0164883 A1 | 6/2016 | Li et al. | |
| 2016/0183081 A1 | 6/2016 | Flores Cuadrado et al. | |
| 2016/0212617 A1 | 7/2016 | Koshimizu et al. | |
| 2016/0277927 A1* | 9/2016 | Lee | H04L 67/51 |
| 2016/0294828 A1* | 10/2016 | Zakaria | H04W 12/06 |
| 2016/0344872 A1 | 11/2016 | Mathison et al. | |
| 2016/0360407 A1* | 12/2016 | Benoit | H04W 12/06 |
| 2017/0034644 A1* | 2/2017 | Chennakeshu | H04W 60/04 |
| 2017/0280321 A1 | 9/2017 | Caceres et al. | |
| 2017/0289788 A1 | 10/2017 | Lalwaney | |
| 2017/0289792 A1 | 10/2017 | Park | |
| 2017/0346822 A1* | 11/2017 | Castinado | H04L 63/0807 |
| 2018/0232516 A1* | 8/2018 | Richardson | G06F 21/32 |
| 2019/0104403 A1 | 4/2019 | Sharma et al. | |
| 2019/0372992 A1* | 12/2019 | Hecker | H04L 61/5038 |
| 2020/0084614 A1 | 3/2020 | Xu | |
| 2020/0195696 A1* | 6/2020 | Seed | H04W 4/70 |
| 2020/0228969 A1 | 7/2020 | Shin et al. | |
| 2020/0314240 A1* | 10/2020 | Leavitt | G16H 80/00 |

OTHER PUBLICATIONS

Park, et al., "Secure Profile Provisioning Architecture for Embedded UICC", [Online], Apr. 2013, [Retrieved: Feb. 12, 2022], 2013 International Conference on Availability, Reliability and Security, Retrieved from: <https://ieeexplore.ieee.org/stamp/stamp.jsp?tp=&arnumber=6657256 > (Year: 2013).

\* cited by examiner

SYSTEM AND METHOD FOR DERIVING A PROFILE FOR A TARGET ENDPOINT DEVICE

RELATED APPLICATION

This application is a continuation of U.S. patent application Ser. No. 16/405,826, entitled "SYSTEM AND METHOD FOR DERIVING A PROFILE FOR A TARGET ENDPOINT DEVICE," filed May 7, 2019, which is incorporated herein by reference in its entirety.

BACKGROUND

A universal integrated circuit card (UICC), often referred to as a subscriber identification module (SIM) or SIM card, is a smart card that is used in electronic devices to access Global System for Mobile communications (GSM) networks, Universal Mobile Telecommunications System (UMTS) networks, Long-Term Evolution (LTE) networks, Fifth Generation (5G) networks, and/or the like. For example, a UICC may securely store information used to identify and authenticate a subscriber on a wireless network associated with a particular mobile network operator (MNO). An embedded UICC (eUICC) or embedded SIM (eSIM) is a UICC that is built into an electronic device and can be remotely provisioned with one or more operator profiles. Accordingly, in an electronic device with an eUICC, different operator profiles can be installed, enabled, disabled, deleted, and/or the like without having to physically swap the eUICC.

DETAILED DESCRIPTION OF PREFERRED EMBODIMENTS

Figure 1A:
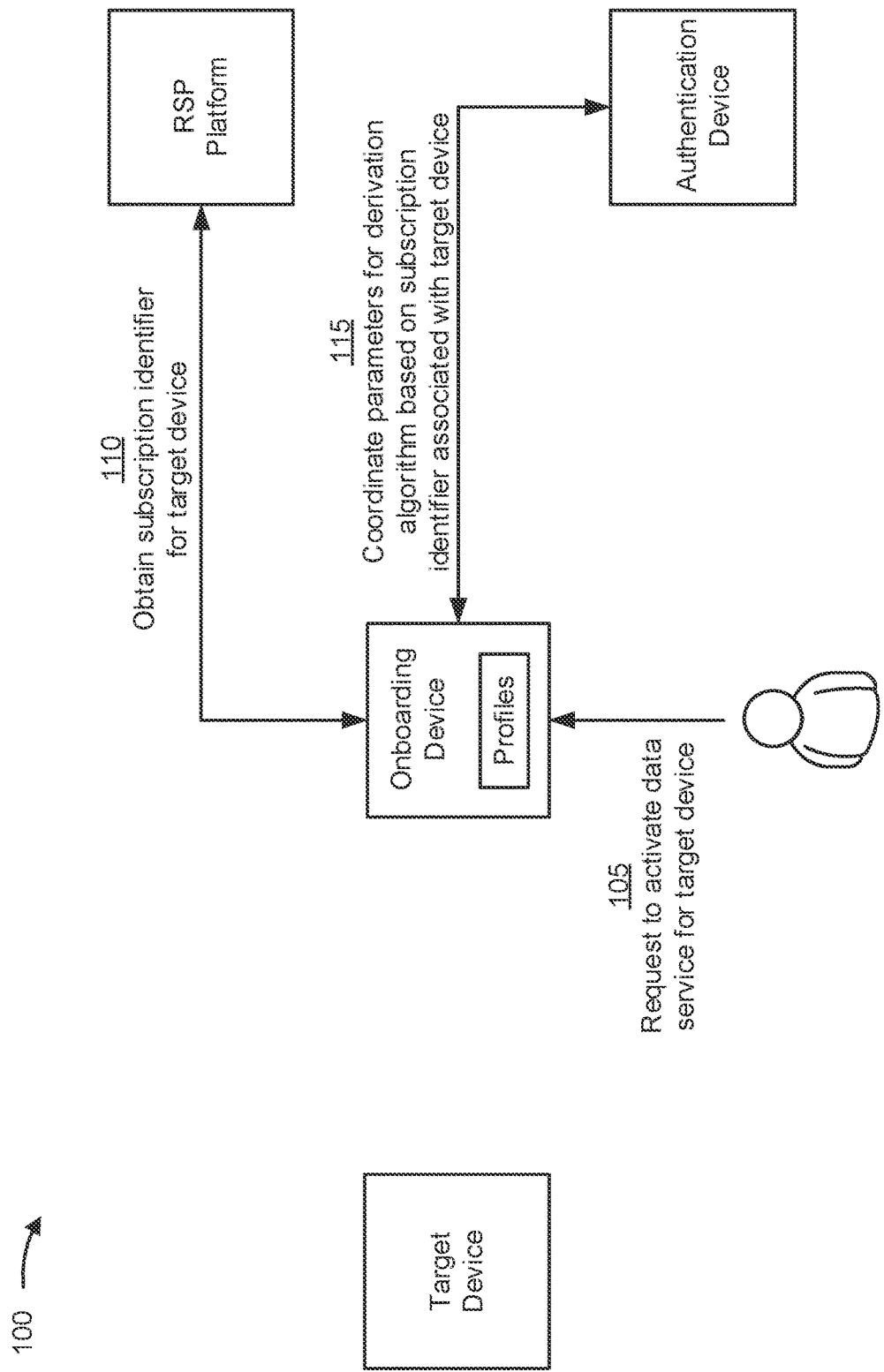
FIGS. 1A-1D are diagrams of one or more example implementations described herein.

The following detailed description of example implementations refers to the accompanying drawings. The same reference numbers in different drawings can identify the same or similar elements.

A traditional subscriber identification module (SIM) (commonly referred to as a SIM card) is used to securely store information for identifying and authenticating a subscriber on a wireless network associated with a particular mobile network operator (MNO). Accordingly, the traditional SIM card is owned and issued by a specific MNO. For example, in a typical scenario, an end user may establish a service contract with an MNO and receive a SIM card that can be inserted into an electronic device, and the SIM card may contain subscription credentials issued and authenticated by the MNO. The electronic device can then connect to the wireless network associated with the MNO using the subscription credentials stored on the SIM card.

Similar to the traditional SIM, a computing module called an embedded SIM (eSIM) has been developed to control authentication and service access for next generation electronic devices, including machine-to-machine (M2M) devices that may operate without end user interaction (e.g., smart meters, light bulbs, appliances, and/or the like) and consumer devices managed by end users (e.g., smart phones, smart watches, wearables, connected cars, and/or the like). However, unlike a traditional SIM, an eSIM is not removable and is remotely programmable and has a capability to accommodate multiple profiles, each of which may include MNO and subscriber data that would otherwise be stored on a traditional SIM card. For example, the eSIM may be implemented as an embedded Universal Integrated Circuit Card (eUICC) that stores MNO credentials and provides the ability to remotely program (or reprogram) the MNO credentials over-the-air (OTA) through a process called remote SIM provisioning (RSP).

For example, the RSP process may utilize a server-driven push model and/or a client-driven pull model in which an electronic device with an eUICC or eSIM is connected to an RSP platform. In some implementations, the RSP platform may be associated with a particular MNO, a third-party service provider, and/or another suitable entity. The RSP platform may remotely provision the electronic device with a profile that includes data related to a subscription with the particular MNO (e.g., an International Mobile Subscriber Identity (IMSI), an Integrated Circuit Card Identifier (ICCID), security algorithms, and/or the like). To subsequently change to a new MNO, the electronic device may connect to the RSP platform associated with the new MNO and download a new profile that includes data related to a subscription with the new MNO.

Accordingly, eUICC technology has become increasingly popular and is being increasingly deployed by device manufacturers due to the flexibility whereby a device having an eUICC can connect to the RSP platform in order to download a suitable profile to onboard live data service for the device. Furthermore, in addition to providing the flexibility to choose any MNO without having to swap out a SIM card, eUICC technology addresses challenges that may arise with respect to changing SIM cards in M2M or Internet of Things (IoT) devices that may be remotely located, hermetically sealed, and/or the like.

Although eUICC technology offers the flexibility to remotely provision a device with a profile that may enable live data service, the remote provisioning process is subject to various security features that create challenges when a user may want to temporarily share a subscription among multiple devices. For example, with the increasing prevalence of M2M, IoT, and/or other "smart" devices, there are many situations in which the user may have an opportunity to utilize communication capabilities associated with another device that may be owned by a third party (e.g., a rental car, a wireless access device in a hotel, and/or the like). In other situations, the user may own several devices that have communication capabilities but one or more of the devices may not have an active data plan (e.g., the user may have a smartphone covered in a subscription associated with an active data plan and a tablet, a vehicle, a smartwatch, and/or the like that have communication capabilities but no active subscription). In these and/or similar situations, the user may want to temporarily share an active subscription with one or more other devices in order to gain on-demand data connectivity, share information associated with the active subscription (e.g., a phone number), and/or the like.

One challenge that arises in this context is that a particular MNO generally has a finite quantity of profiles that are available to distribute to subscribers. For example, each profile may generally include a subscriber identifier (e.g., an International Mobile Subscriber Identity (IMSI), a Subscription Permanent Identifier (SUPI), a Subscription Concealed Identifier (SUCI), and/or the like) that is used to identify a particular user. The subscriber identifier may include a first sequence of digits to represent a mobile country code (MCC), which may be followed by a second sequence of digits to represent a mobile network code (MNC) and a third sequence of digits to represent a mobile subscription identification number (MSIN) that identifies the particular user in a subscriber base of the MNO. In other words, in the conventional format for a subscription identifier (e.g., as used in an IMSI, a SUPI, a SUCI, and/or the like), a portion of the subscription identifier is typically shared among all subscribers of a particular MNO, and a finite quantity of permutations is available for the remaining portion that is unique to each subscriber of the particular MNO. Accordingly, if an MNO were to allow subscribers to readily obtain short-term profiles to temporarily share a subscription with another device, the subscription identifiers available to distribute to subscribers of the MNO may become exhausted.

Furthermore, the profile provisioning process may introduce significant overhead, resulting in wasted computing resources (e.g., processor resources, memory resources, communication resources, and/or the like) to prepare, distribute, and/or otherwise manage short-term profiles. For example, when a user establishes a subscription with a particular MNO, the RSP platform associated with the MNO will typically prepare a profile for the user and associate the profile with one or more codes (e.g., an activation code, a confirmation code, and/or the like). Moreover, because the profile will contain the subscription identifier for the user and one or more secret keys used for authentication, encryption, and/or the like, the RSP platform implements pre-shared key (PSK) and/or public key infrastructure (PKI) cryptography to securely transfer the profile using end-to-end encryption. Accordingly, this can lead to further resource consumption, as processes to create and secure public-private key pairs, negotiate a shared secret (e.g., using a Diffie-Hellman key exchange), obtain certificates to prove and verify identities, and/or the like tend to be computationally intensive.

Some implementations described herein may configure a user equipment to act or otherwise behave as an onboarding device to generate a derived profile for a target device to be onboarded onto a wireless network associated with an MNO for the onboarding device. For example, the onboarding device may have an active profile associated with a subscription that a user of the onboarding device has arranged with the MNO, and the active profile may include an existing set of credentials (e.g., a SIM card identifier such as an Integrated Circuit Card Identifier (ICCID), an eUICC identifier (eID), and/or the like, a subscription identifier such as an IMSI, SUPI, SUCI, and/or the like, an authentication key ($K_i$), a derived operator code (OPc) that may be randomized or derived from the authentication key in combination with an operator code allotted to the MNO, and/or the like). In some implementations, the onboarding device may obtain a subscription identifier for the target device (e.g., from a pool of subscription identifiers allocated for temporary subscription sharing), and the onboarding device may generate a derived set of credentials to be associated with the subscription identifier for the target device based on the existing set of credentials in the active profile associated with the onboarding device (e.g., using a key derivation function).

Accordingly, the onboarding device may generate a derived profile that includes the subscription identifier for the target device and the derived set of credentials, and the onboarding device may cause the derived profile to be provisioned onto an eUICC of the target device. For example, the onboarding device may provide the derived profile for the target device to the RSP platform associated with the MNO and provide, to the target device, instructions for obtaining the derived profile from the RSP platform using business-as-usual (BAU) procedures. Additionally, or alternatively, the onboarding device may obtain a permission certificate from the RSP platform (e.g., a certificate that is subordinate to a certificate issued to the RSP platform by a trusted certificate issuer and inherits trustworthiness of a self-signed root certificate associated with the trusted certificate issuer), and the onboarding device may use the permission certificate to directly provision the derived profile to the target device. In this way, generating the derived set of credentials and the derived profile on the onboarding device may conserve various computing resources that would otherwise be consumed by having the RSP platform generate credentials and prepare a profile for the target device. Furthermore, by allocating the subscription identifier for the target device from a pool of subscription identifiers that are allocated to temporary subscription sharing, the subscription identifier obtained for the target device can be reclaimed (e.g., returned to the pool) if and/or when the onboarding device disassociates from the target device. Further still, in implementations where the onboarding device directly provisions the derived profile to the target device, additional resources may be conserved because the target device can be provisioned with the derived profile in a manner that avoids any communication with the RSP platform associated with the MNO.

Furthermore, in some implementations, one or more procedures that the onboarding device uses to generate the derived set of credentials may be coordinated with an authentication device on the wireless network associated with the MNO. For example, because the existing set of credentials in the active profile of the onboarding device is associated with a subscription that the user of the onboarding device has arranged with the MNO, the authentication device may have one or more database entries that associate the existing set of credentials with the subscription that the user of the onboarding device has arranged with the MNO. Accordingly, the onboarding device and the authentication device may coordinate one or more parameters to be used as inputs to a derivation algorithm (e.g., the key derivation function) used to generate the derived set of credentials. For example, the onboarding device and the authentication device may coordinate a cryptographic salt or seed, a random number, a number of iterations, and/or the like to be used as inputs to the derivation algorithm, whereby the onboarding device and the authentication device may independently generate the derived set of credentials by using the same derivation algorithm and the same set of inputs. In this way, when the derived profile is provisioned to the target device and the target device attempts to attach to the wireless network associated with the MNO, a subscription identifier in the derived profile may have one or more corresponding entries at the authentication device. In this way, because the derived set of credentials is available to the target device and the authentication device, the target device may obtain authenticated access to the wireless network by performing an authentication challenge-response procedure (e.g., a Milenage exchange) with the authentication device.

FIGS. 1A-1D are diagrams of one or more example implementations 100 described herein. As will be described in further detail herein, example implementation(s) 100 can include a first user equipment that can act or otherwise behave as an onboarding device to generate a derived profile that can be provisioned to a second user equipment that corresponds to a target device to be onboarded onto a wireless network associated with a mobile network operator (MNO) for the first user equipment. Furthermore, example implementation(s) 100 may include a remote SIM provisioning (RSP) platform that may support the onboarding device with respect to generating the derived profile and/or provisioning the derived profile to the target device. For example, the RSP platform may include a Subscription Manager Data Preparation (SM-DP) device, a Subscription Manager Secure Routing (SM-SR) device, a Subscription Manager Data Preparation Plus (SM-DP+) device that combines the functions of an SM-DP device and an SM-SR device, and/or the like. In some implementations, example implementation(s) 100 may further include an authentication device that may coordinate one or more parameters for generating the derived profile with the onboarding device and use the one or more coordinated parameters to generate a derived set of credentials for authenticating the target device based on the derived profile. For example, the authentication device may be a Long-Term Evolution (LTE) Home Subscriber Server (HSS), a 5G Authentication Server Function (AUSF), a 5G Unified Data Management (UDM) function, and/or the like.

Figure 1B:
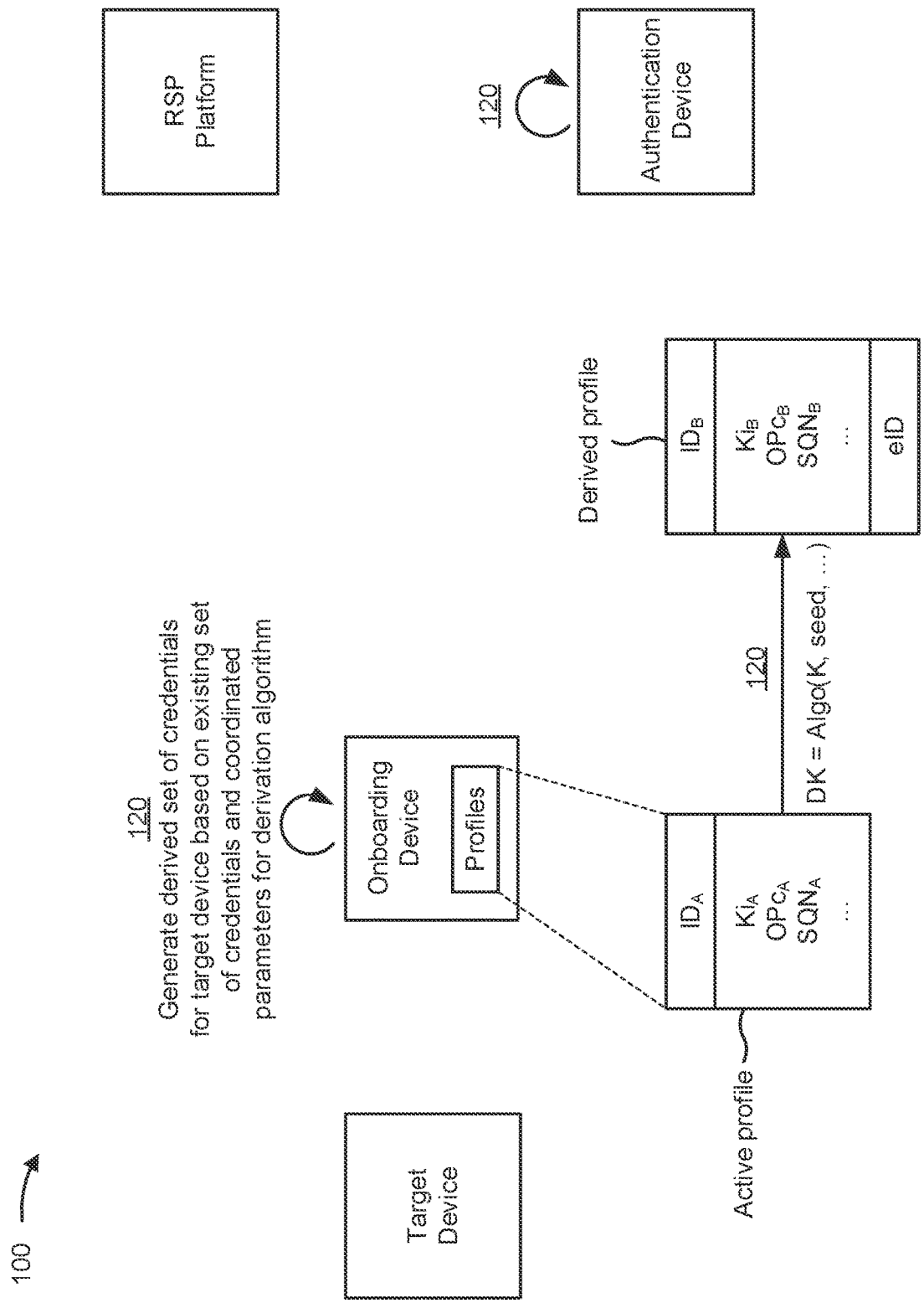
Figure 1C:
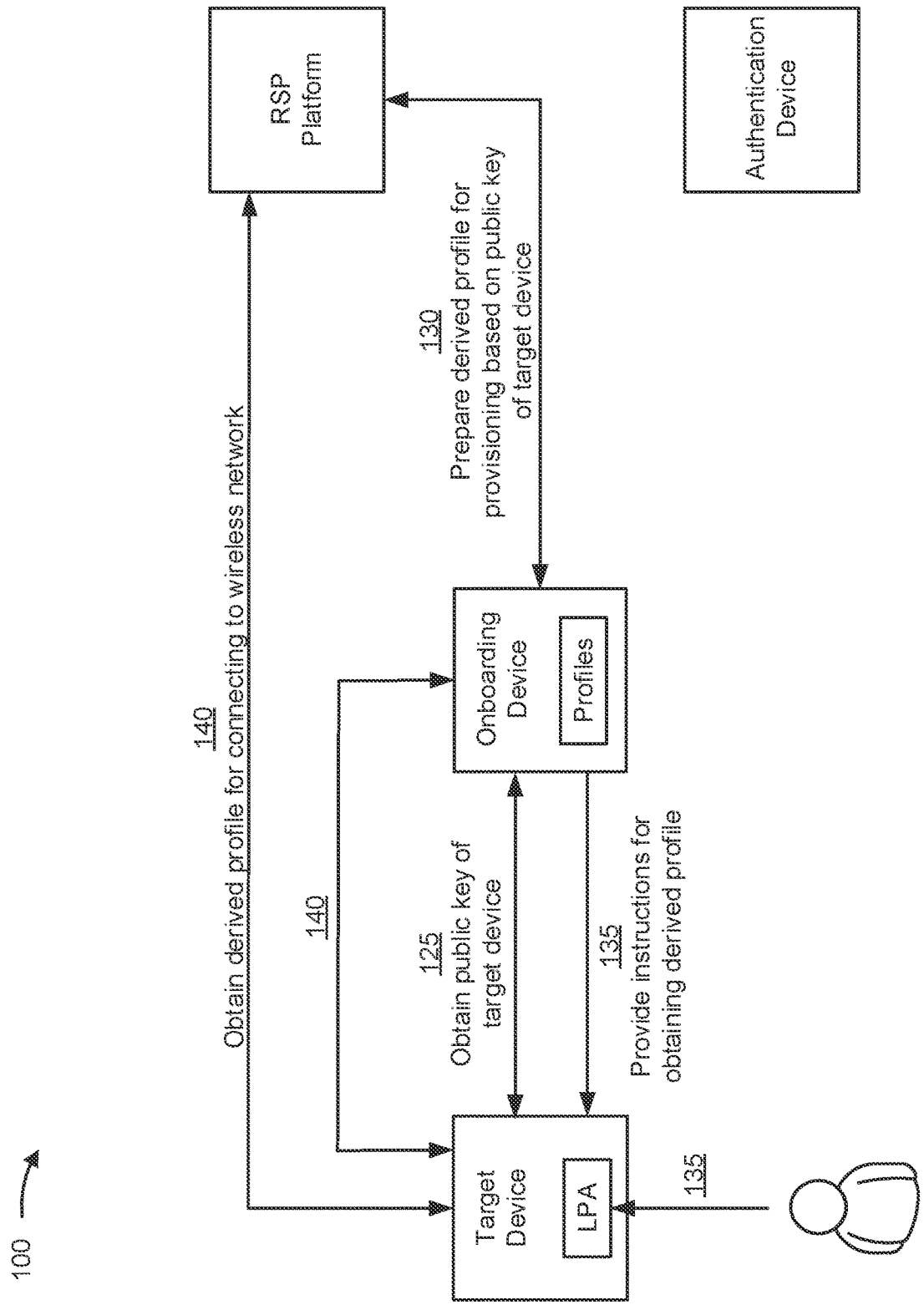
Figure 1D:
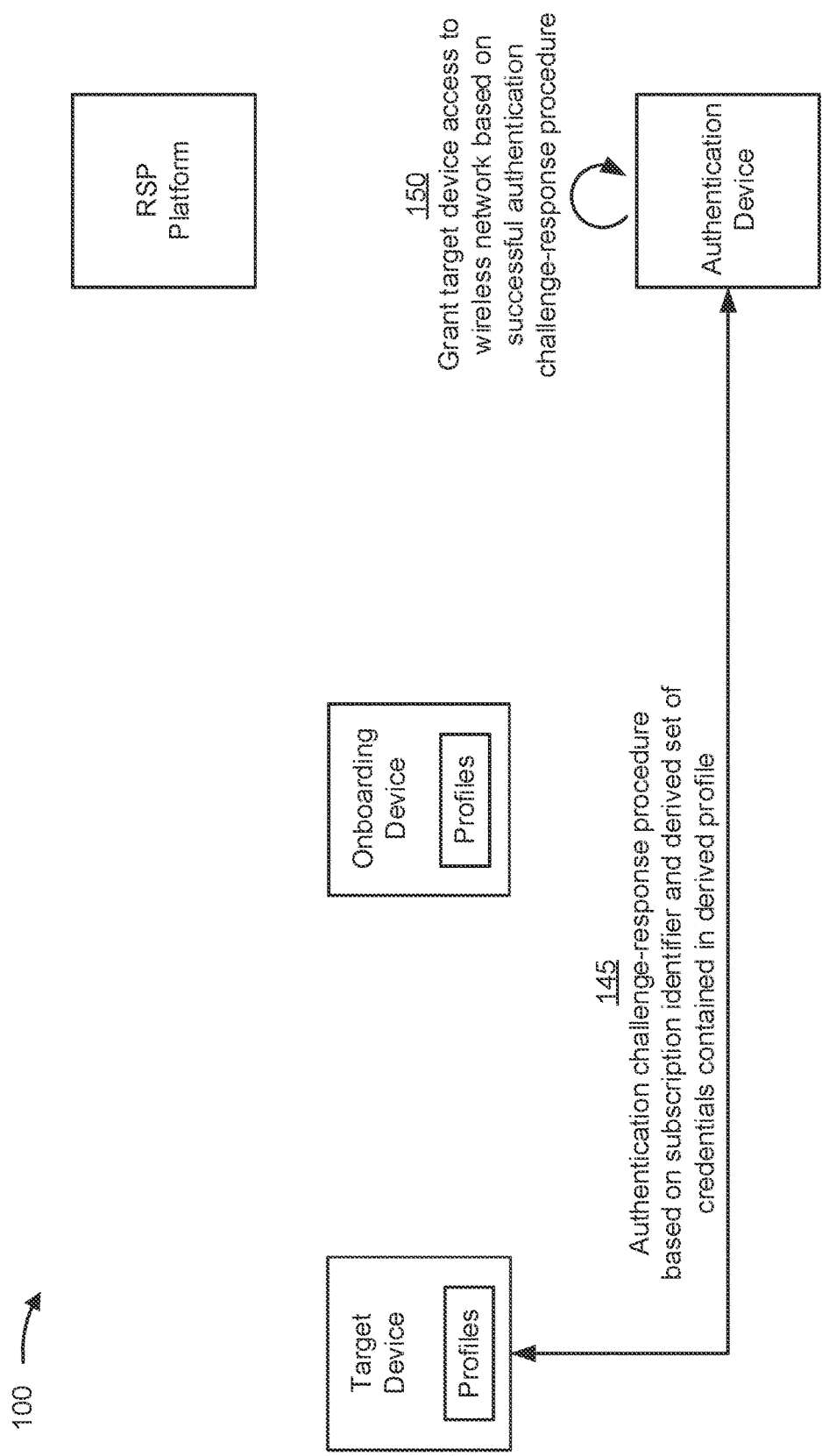

As shown in FIG. 1A, the first user equipment (which may be referred to herein as "the onboarding device") may obtain a subscription identifier for the second user equipment (which may be referred to herein as "the target device") and determine, in coordination with the authentication device, one or more parameters to be used in a derivation algorithm based on the subscription identifier obtained for the target device. As shown in FIG. 1B, the onboarding device may generate a derived profile for the target device, which may include a derived set of credentials that the onboarding device and the authentication device independently generate based on the coordinated parameters and an existing set of credentials in an active profile of the onboarding device. As shown in FIG. 1C, the onboarding device may cause the derived profile to be provisioned onto an embedded Universal Integrated Circuit Card (eUICC) of the target device based on a public key of the target device (e.g., via direct provisioning and/or business-as-usual provisioning through the RSP platform). As shown in FIG. 1D, the target device may use the subscription identifier and the derived set of credentials contained in the derived profile to perform an authentication challenge-response procedure with the authentication device, which may authenticate the target device and grant the target device access to the wireless network associated with the MNO based on a successful authentication challenge-response procedure.

As shown in FIG. 1A, and by reference number 105, the onboarding device may receive a request to activate data service for the target device from a user having a subscription with a particular MNO. For example, the user may provide the request to initiate a profile derivation and provisioning procedure for the target device in order to activate data service for the target device, which may have capabilities to communicate over a cellular network (e.g., a wireless wide area network, such as a Long-Term Evolution (LTE) network, a 5G New Radio (NR) network, a Narrow-band IoT (NB-IoT) network, and/or the like). Accordingly, the user may initiate the profile derivation and provisioning procedure to onboard the target device onto a wireless network associated with the MNO and to share the subscription that the user has with the MNO with the target device. In this way, in addition to activating data service for the target device, information associated with the existing subscription that the user has with the MNO (e.g., a phone number) can be shared with the target device.

In some implementations, the MNO may offer one or more services to subscribers that provide an option to share a subscription with one or more target devices on-demand. For example, when the user establishes the subscription with the MNO for the first user equipment that acts as the onboarding device, the one or more services that provide the option to share the subscription with target devices may be included in a cost of the subscription, added to the subscription for an additional cost, and/or the like. Additionally, or alternatively, the user may register for the one or more services as-needed. In this way, by arranging the one or more services to share the subscription with the MNO, the MNO can establish appropriate configurations, permissions, and/or the like to allow the first user equipment to act as the onboarding device when the profile derivation and provisioning procedure is initiated. For example, the MNO can communicate with the RSP platform to indicate that the first user equipment is allowed to act as the onboarding device, which may allow for certain information to be shared with the onboarding device to enable the profile derivation and provisioning procedure described herein. Furthermore, the MNO can configure the authentication device to enable profile derivation for a subscription identifier associated with the user, which may allow the target device to obtain authenticated access to the wireless network, share information such as a phone number with the subscription identifier associated with the user, and/or the like.

As further shown in FIG. 1A, and by reference number 110, the onboarding device may obtain a subscription identifier for the target device. In some implementations, the subscription identifier may be obtained from a pool of subscription identifiers that the MNO has reserved or otherwise allocated to the service(s) used to share a subscription associated with the MNO. Accordingly, as described in further detail elsewhere herein, the subscription identifier obtained for the target device may be reclaimed and made available for subsequent use by a different device if and/or when the first user equipment (the onboarding device) disassociates from the target device. In this way, the MNO may be assured that the subscription identifiers available to the MNO will not be exhausted by allocating subscription identifiers to target devices that are temporarily sharing a subscription associated with the MNO. For example, the pool of subscription identifiers may be a global pool of subscription identifiers available to any subscriber of the MNO that uses the service(s) providing the option to share a subscription. In some implementations, the global pool of subscription identifiers may be managed by the RSP platform according to a lease process, where the onboarding device can obtain a particular subscription identifier from the pool for a lease period, after which the subscription identifier is returned to the pool unless the lease period is renewed. Additionally, or alternatively, each subscriber that registers for the service(s) to share a subscription associated with the MNO may be assigned a given quantity of additional subscription identifiers that the subscriber can dynamically assign to target devices as-needed.

In some implementations, the subscription identifier obtained for the target device may be any suitable subscription identifier that may otherwise be included in a profile that is prepared, distributed, and/or otherwise managed by the RSP platform. For example, the subscription identifier may be an International Mobile Subscriber Identity (IMSI), a Subscription Permanent Identifier (SUPI), and/or the like to uniquely identify a particular cellular network user. For example, an IMSI is generally presented as a sequence of digits, including a first set of digits that represent a mobile country code (MCC), which is followed by a second set of digits that represent a mobile network code (MNC) and a third set of digits that represent a mobile subscription identification number (MSIN) for the particular cellular network user. Furthermore, a SUPI is globally unique identifier that may be allocated to a particular subscriber in a 5G wireless network, where the SUPI may be formatted as an IMSI, a Network Access Identifier (NAI), and/or the like. Additionally, or alternatively, the subscription identifier may be a Subscription Concealed Identifier (SUCI), which may be used during certain procedures in a 5G network to protect privacy and/or security for a subscriber by partially encrypting the MSIN component of the subscriber's IMSI, SUPI, and/or the like.

As further shown in FIG. 1A, and by reference number 115, the onboarding device and the authentication device may coordinate one or more parameters to be used in a derivation algorithm for generating a derived profile for the target device. For example, in some implementations, the subscriber identifier obtained for the target device may be conveyed to the authentication device (e.g., by the onboarding device, the RSP platform, another device in the wireless network associated with the MNO, and/or the like), and the authentication device may associate the subscriber identifier obtained for the target device with an existing set of credentials associated with the onboarding device. For example, the existing set of credentials may include a subscription identifier (e.g., an IMSI, a SUPI, and/or the like) for the onboarding device, an authentication key for the onboarding device, a derived operator code for the onboarding device, and/or the like. Accordingly, the coordination between the onboarding device and the authentication device may be performed to ensure that the onboarding device and the authentication device are able to independently generate a derived set of credentials for the target device, and that the derived set of credentials generated by the onboarding device will match the derived set of credentials generated by the authentication device.

For example, in some implementations, the onboarding device and the authentication device may coordinate the derivation algorithm (e.g., a key derivation function) that will be used to generate the derived set of credentials as well as the inputs to the derivation algorithm. As mentioned above, the inputs to the derivation algorithm may include the existing set of credentials in the active profile associated with the onboarding device. Furthermore, the inputs to the derivation algorithm may include one or more additional parameters, such as a random number, a number of iterations, and/or the like. For example, the random number may be a cryptographic salt or seed, which refers to random data (e.g., an alphanumeric string) generated according to a scheme that ensures global uniqueness (e.g., by ensuring that the cryptographic salt or seed has a sufficient length and/or entropy that makes a collision cryptographically unlikely). In some implementations, the cryptographic salt may be selected by the onboarding device and communicated to the authentication device, or the cryptographic salt may be selected by the authentication device and communicated to the onboarding device. Additionally, or alternatively, the onboarding device and the authentication device may independently select the cryptographic salt to be used as an input to the derivation algorithm based on a random number scheme that is coordinated between the devices (e.g., the cryptographic salt may be selected using a sequence of random numbers, a pseudorandom number generator, and/or the like based on a seed, an index, and/or the like that is synchronized or otherwise coordinated between the onboarding device and the authentication device).

Accordingly, as shown in FIG. 1B, and by reference number 120, the onboarding device and the authentication device may independently generate a derived set of credentials for the target device based on the existing set of credentials associated with the onboarding device and the one or more parameters for the derivation algorithm that are coordinated between the onboarding device and the authentication device. For example, as shown in FIG. 1B, an active profile for the onboarding device may include the subscription identifier for the onboarding device ($ID_A$, which may correspond to an IMSI, a SUPI, and/or the like) and a set of authentication vectors. For example, the set of authentication vectors may include an authentication key ($Ki_A$) for the onboarding device (e.g., a 128-bit value used to authenticate the onboarding device on the wireless network of the MNO and/or derive an encryption key for securing communication between the onboarding device and the wireless network), a derived operator code ($OPc_A$) that is unique to a particular MNO subscriber and derived from an operator code (OP) common to all subscribers of the MNO, a sequence number ($SQN_A$), and/or the like.

In general, the authentication vectors in the active profile associated with the onboarding device may correspond to precursors of data that may be used during an authentication challenge-response between the onboarding device and the authentication device (e.g., an exchange based on a Milenage algorithm). The authentication vectors in the active profile associated with the onboarding device, the derivation algorithm, and the inputs to the derivation algorithm are therefore known to both the onboarding device and the authentication device, which may independently generate the derived set of credentials accordingly. For example, the derivation algorithm may be a keyed cryptographic hash function, a key stretching algorithm, a key strengthening algorithm, a password-based derivation function, and/or the like. Accordingly, to generate the derived set of credentials, each authentication vector (or credential) in the active profile associated with the onboarding device may be input to the derivation algorithm along with the cryptographic salt or seed, random number(s), and/or other parameters coordinated between the onboarding device and the authentication device. As further shown in FIG. 1B, the derived set of credentials may be associated with the subscription identifier obtained for the target device and with an eID associated with the eUICC of the target device. Furthermore, the authentication device may associate the derived set of credentials with the existing set of credentials in the active profile associated with the onboarding device (e.g., for accounting purposes, to enable sharing of a phone number, and/or the like).

In this way, when the onboarding device generates the derived set of credentials for the target device, coordinating the parameters of the derivation algorithm between the onboarding device and the authentication device may ensure that the target device will have a correlating entry at the authentication device when the target device subsequently attempts to access the wireless network associated with the MNO. Furthermore, by coordinating only the derivation algorithm and certain inputs to the derivation algorithm, the derived set of credentials is not shared over the wireless network, which improves security for the derived set of credentials. For example, even if an attacker were to obtain access to the cryptographic salt, seed, random number(s), and/or other parameters, the attacker will be unable to generate the derived set of credentials unless the existing set of credentials is also compromised. Further still, exchanging or otherwise coordinating the inputs to the derivation algorithm between the onboarding device and the authentication device may reduce a burden on the wireless network associated with the MNO, as the authentication device does not have to communicate with the RSP platform and/or other devices that may be involved in preparing and provisioning profiles.

As shown in FIG. 1C, and by reference number 125, the onboarding device may obtain a public key of the target device, and the public key of the target device may be used to facilitate preparing and provisioning the derived profile onto the eUICC of the target device. For example, the eUICC of the target device may generally be configured to obtain a profile from the RSP platform using Public Key Infrastructure (PKI) based cryptography, whereby the RSP platform is conventionally the only device that has appropriate permissions, capabilities, and/or the like to communicate with the eUICC. In particular, the eUICC and the RSP platform typically use end-to-end encryption in combination with mutual authentication. In this way, the eUICC can validate that a profile to be installed originates from a valid RSP platform, and the RSP platform can validate that the eUICC is at the other end of the connection. Accordingly, the onboarding device may obtain the public key of the target device to facilitate provisioning the derived profile (e.g., by providing the RSP platform with information to enable mutual authentication and end-to-end encryption, by using the public key of the target device to obtain a permission certificate that will make the onboarding device appear to be an RSP platform from the perspective of the target device, and/or the like).

As further shown in FIG. 1C, and by reference number 130, the onboarding device may communicate with the RSP platform to prepare the derived profile for provisioning to the target device. For example, in implementations in which the target device obtains the derived profile from the RSP platform using business-as-usual (BAU) procedures, the onboarding device may provide the public key of the target device to the RSP platform together with the derived set of credentials that was generated based on the existing set of credentials in the active profile of the onboarding device. In such cases, the RSP platform may use the public key of the target device to generate an encryption key for the profile and create a package that includes the subscription identifier for the target device, the derived set of credentials, the encryption key, and/or the like. The RSP platform may further use the public key of the target device to encrypt the package, which at that time may be prepared and ready for downloading by the target device.

Additionally, or alternatively, in implementations in which the target device obtains the derived profile from the onboarding device, the onboarding device may similarly provide the public key of the target device to the RSP platform to negotiate the encryption key for the derived profile to be provisioned onto the eUICC of the target device. The RSP platform may return the encryption key to the onboarding device, which may create the package that includes the subscription identifier for the target device, the derived set of credentials, the encryption key, and/or the like. In such cases, the onboarding device may similarly use the public key of the target device to encrypt the package. Furthermore, in some implementations, the onboarding device may obtain a permission certificate from the RSP platform to enable mutual authentication with the eUICC of the target device. For example, a certificate issuer may have a self-signed root certificate that is used to verify certificates that are issued and signed by the certificate issuer, including a certificate issued to the RSP platform. The eUICC of the target device may have a copy of a public key associated with the self-signed root certificate, which can be used to verify certificates in a certificate chain in which the certificate issuer acts as a trusted root. Accordingly, in some implementations, the certificate issuer may enable the RSP platform to act as a subordinate certificate issuer, which may allow the RSP platform to issue the permission certificate to the onboarding device. When the target device uses the public key of the self-signed root certificate to verify the permission certificate issued to the onboarding device, the target device may be able to verify the permission certificate in a similar manner as when verifying the certificate of the RSP platform.

As further shown in FIG. 1C, and by reference number 135, the target device may receive instructions for obtaining the derived profile (e.g., from the RSP platform or the onboarding device configured to behave in a similar manner as the RSP platform). For example, in some implementations, a user may launch a Local Profile Assistant (LPA) to download the encrypted derived profile to the eUICC of the target device. The LPA may provide an end user interface that can be used to manage the status of one or more profiles. For example, the user may enter an address of the provisioning device (e.g., an address of the RSP platform, an address of the onboarding device, and/or the like) and one or more codes (e.g., an activation code, a confirmation code, and/or the like) that the LPA uses to connect to the appropriate provisioning device. Additionally, or alternatively, the onboarding device may communicate with the target device to provide the instructions for obtaining the derived profile without user direction.

As further shown in FIG. 1C, and by reference number 140, the target device may obtain the derived profile for connecting to the wireless network from the RSP platform and/or the onboarding device. For example, as mentioned above, the target device may use BAU procedures when the derived profile is obtained from the RSP platform. In cases where the target device obtains the derived profile from the onboarding device, any suitable data transfer mechanism may be employed. For example, the derived profile may be provided to the target device via a wireless personal area network (WPAN) connection, a wireless local area network (WLAN) connection, a near-field communication (NFC) transfer, a wired transfer, and/or the like. In any case, the target device may obtain a package in which the derived profile is encrypted using the public key of the target device, and the target device may decrypt the derived profile using a private key that corresponds to the public key. Accordingly, the derived profile can be installed on the eUICC of the target device and enabled to activate live data service.

As shown in FIG. 1D, and by reference number 145, the target device may use the subscription identifier contained in the derived profile to attempt to attach to the wireless network associated with the MNO, which may cause an authentication challenge-response procedure to be performed between the target device and the authentication device. For example, when the target device attempts to attach to the wireless network associated with the MNO using the subscription identifier contained in the derived profile, the attach request may be routed to the authentication device, and the authentication device may obtain the derived set of credentials that was previously generated and associated with the subscription identifier.

Accordingly, the authentication device may generate a random number (RAND) (e.g., a nonce) and identify the authentication vectors that are associated with the subscription identifier (e.g., the authentication key ($Ki_B$) for the target device, the derived operator code ($OPc_B$) unique to the target device, the sequence number ($SQN_B$), and/or the like). The authentication device may use these values as inputs to an authentication algorithm (e.g., a Milenage algorithm) that outputs an authentication token (AUTN). In some implementations, the authentication device may transmit, to the target device, an authentication request (or challenge) message that includes values for the RAND and AUTN variables, and the target device is expected to be able to use the RAND value and the derived set of credentials to generate a matching result for AUTN (e.g., because the derived set of credentials should be stored on the eUICC of the target device if the target device is authentic). Accordingly, based on the RAND value received from the authentication device, the target device may use the same authentication algorithm to generate an AUTN value based on the values for RAND, $Ki_B$, $OPc_B$, $SQN_B$, and/or the like, and the target device may transmit the locally generated AUTN value to the authentication device in a response to the authentication request (or challenge) message.

As further shown in FIG. 1D, and by reference number 150, the authentication device may authenticate the target device and grant access to the wireless network based on the AUTN value contained in the authentication response message matching the AUTN value previously generated by the authentication device. Accordingly, the target device may communicate over the wireless network using the derived profile, and the association between the subscription identifier contained in the derived profile and the subscription identifier in the active profile associated with the onboarding device may enable certain information (e.g., a phone number, data plan, and/or the like) to be shared between the onboarding device and the target device.

Furthermore, if and/or when the onboarding device disassociates from the target device, the onboarding device may communicate with the RSP platform, the authentication device, and/or the like to indicate that the information associated with the derived profile is to be deactivated. Additionally, or alternatively, the derived profile may be configured to expire after a lease period ends unless the lease period is renewed, in which case the onboarding device may disassociate from the target device by not renewing the lease period. For example, the RSP platform may have a capability to remotely disable or delete the derived profile from the eUICC of the target device and return the subscription identifier contained in the derived profile to the pool of subscriber identifiers used to share subscriptions of the MNO when the onboarding device indicates that the information associated with the derived profile is to be deactivated or the lease period associated with the derived profile expires. Furthermore, the authentication device may remove the derived set of credentials from the one or more entries that are associated with the subscription identifier such that the target device will be unable to use the derived set of credentials to obtain authenticated access to the wireless network after the disassociation occurs.

As indicated above, FIGS. 1A-1D are provided as one or more examples. Other examples can differ from what is described with regard to FIGS. 1A-1D. For example, in some implementations, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) in implementation(s) 100 may perform one or more functions described as being performed by another set of devices in implementation(s) 100.

Figure 2:
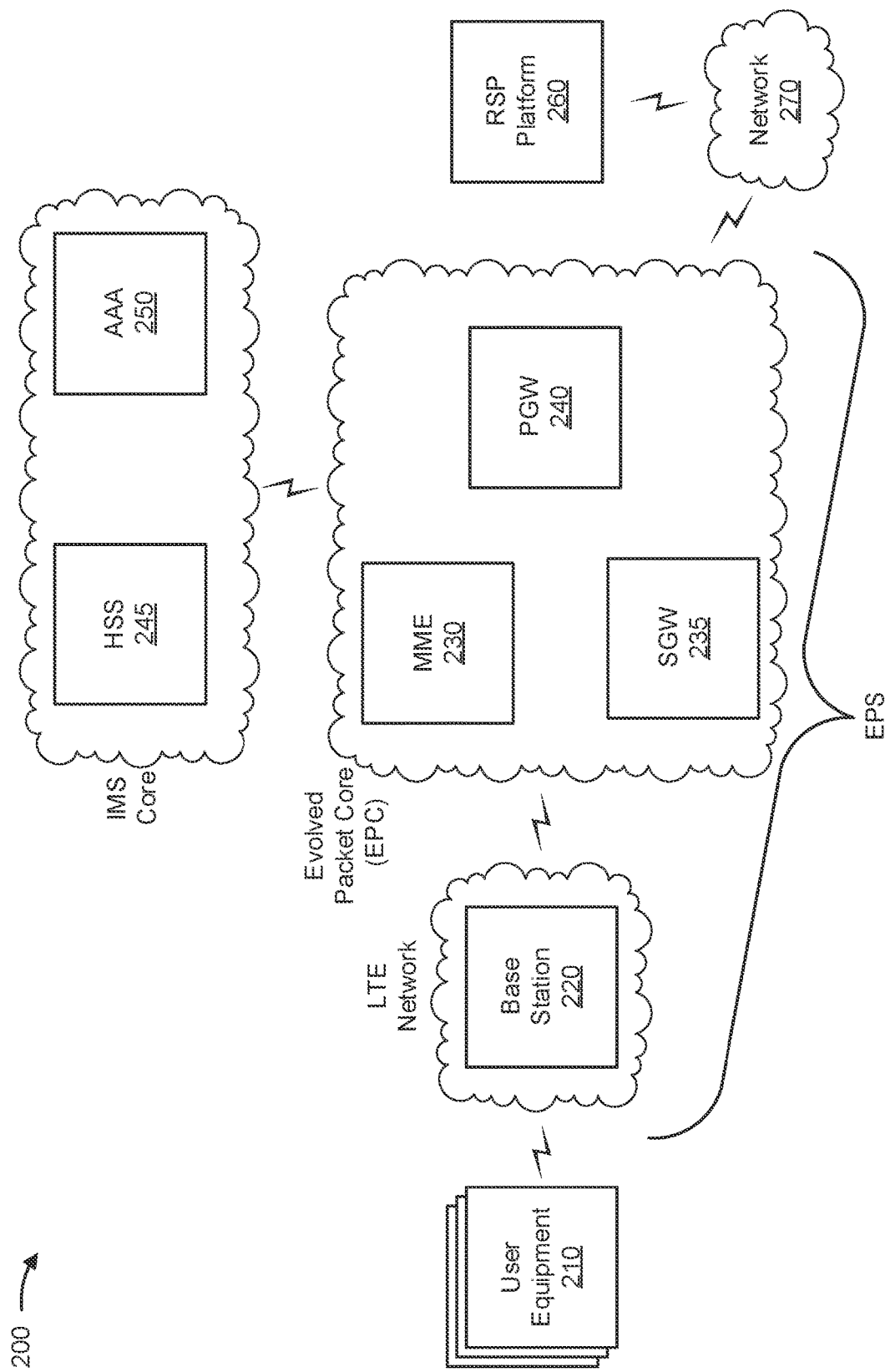
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user equipment 210, a base station 220, a mobility management entity device (MME) 230, a serving gateway (SGW) 235, a packet data network gateway (PGW) 240, a home subscriber server (HSS) 245, an authentication, authorization, and accounting server (AAA) 250, a remote SIM provisioning (RSP) platform 260, and a network 270. Devices of environment 200 may interconnect via wired connections, wireless connections, or a combination of wired and wireless connections.

Some implementations are described herein as being performed within a Long-Term Evolution (LTE) network for explanatory purposes. Some implementations may be performed within a network that is not an LTE network, such as a third generation (3G) network, a fifth generation (5G) network, and/or the like.

Environment 200 may include an evolved packet system (EPS) that includes an LTE network and/or an evolved packet core (EPC). The LTE network may include a radio access network (RAN) that includes one or more base stations 220 that take the form of evolved Node Bs (eNBs) via which user equipment 210 communicates with the EPC. The EPC may include MME 230, SGW 235, PGW 240, which enable user equipment 210 to communicate with network 270 and/or an Internet protocol (IP) multimedia subsystem (IMS) core. The IMS core may include HSS 245 and/or AAA 250, and may manage device registration and authentication, session initiation, and/or the like, associated with user equipment 210. HSS 245 and/or AAA 250 may reside in the EPC and/or the IMS core.

User equipment 210 includes one or more devices capable of communicating with base station 220 and/or a network (e.g., network 270). For example, user equipment 210 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, an Internet of Things (IoT) device (e.g., a smart appliance, a smart light, a connected vehicle, and/or the like), and/or a similar device. User equipment 210 may send traffic to and/or receive traffic from network 270 (e.g., via base station 220, MME 230, SGW 235, and/or PGW 240). In some implementations, user equipment 210 includes a first device that may generate a derived profile that a second device can use to access a wireless network subscription of the first device based on a derived set of credentials that is generated based on an existing set of credentials associated with the wireless network subscription of the first device. Additionally, or alternatively, user equipment 210 may include a device that may be provisioned with a derived profile that includes a derived set of credentials that is generated based on an existing set of credentials associated with the wireless network subscription of another device.

Base station 220 includes one or more devices capable of transferring traffic, such as audio, video, text, packets, and/or other traffic, destined for and/or received from user equipment 210. In some implementations, base station 220 may include an eNB associated with the LTE network that receives traffic from and/or sends traffic to network 270 via MME 230, SGW 235, and/or PGW 240. Additionally, or alternatively, one or more base stations 220 may be associated with a RAN that is not associated with the LTE network. Base station 220 may send traffic to and/or receive traffic from user equipment 210 via an air interface. In some implementations, base station 220 may include a small cell base station, such as a base station of a microcell, a picocell, and/or a femtocell.

MME 230 includes one or more devices, such as one or more server devices, capable of managing authentication, activation, deactivation, and/or mobility functions associated with user equipment 210. In some implementations, MME 230 may perform operations relating to authentication of user equipment 210. Additionally, or alternatively, MME 230 may facilitate the selection of a particular SGW 235 and/or a particular PGW 240 to serve traffic to and/or from user equipment 210. MME 230 may perform operations associated with handing off user equipment 210 from a first base station 220 to a second base station 220 when user equipment 210 is transitioning from a first cell associated with the first base station 220 to a second cell associated with the second base station 220. Additionally, or alternatively, MME 230 may select another MME (not pictured), to which user equipment 210 should be handed off (e.g., when user equipment 210 moves out of range of MME 230).

SGW 235 includes one or more devices capable of routing packets. For example, SGW 235 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 235 may aggregate traffic received from one or more base stations 220 associated with the LTE network, and may send the aggregated traffic to network 270 (e.g., via PGW 240) and/or other network devices associated with the EPC and/or the IMS core. SGW 235 may also receive traffic from network 270 and/or other network devices, and may send the received traffic to user equipment 210 via base station 220. Additionally, or alternatively, SGW 235 may perform operations associated with handing off user equipment 210 to and/or from an LTE network.

PGW 240 includes one or more devices capable of providing connectivity for user equipment 210 to external packet data networks (e.g., other than the depicted EPC and/or LTE network). For example, PGW 240 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 240 may aggregate traffic received from one or more SGWs 235, and may send the aggregated traffic to network 270. Additionally, or alternatively, PGW 240 may receive traffic from network 270, and may send the traffic to user equipment 210 via SGW 235 and base station 220. PGW 240 may record data usage information (e.g., byte usage), and may provide the data usage information to AAA 250.

RSP platform 260 includes one or more devices, such as one or more server devices, capable of receiving, generating, storing, processing, and/or providing information that relates to remotely provisioning user equipment 210 with a SIM profile for accessing and communicating over a wireless network associated with a particular MNO. For example, RSP platform 260 may include a Subscription Manager Data Preparation (SM-DP) device that prepares, stores, and protects SIM profiles (including MNO credentials), downloads and installs a SIM profile onto an eUICC associated with user equipment 210, and/or the like. Additionally, or alternatively, RSP platform 260 may include a Subscription Manager Secure Routing (SM-SR) device that secures a communication link between the eUICC and the SM-DP device, enables, disables, deletes, and/or otherwise manages a status of SIM profiles on the eUICC associated with user equipment 210, and/or the like. Additionally, or alternatively, RSP platform 260 may include a Subscription Manager Data Preparation Plus (SM-DP+) device that encapsulates the functions of an SM-DP device and an SM-SR device.

HSS 245 includes one or more devices, such as one or more server devices, capable of managing (e.g., receiving, generating, storing, processing, and/or providing) information associated with user equipment 210. For example, HSS 245 may manage subscription information associated with user equipment 210, such as information that identifies a subscriber profile of a user associated with user equipment 210, information that identifies services and/or applications that are accessible to user equipment 210, location information associated with user equipment 210, a network identifier (e.g., a network address) that identifies user equipment 210, information that identifies a treatment of user equipment 210 (e.g., quality of service information, a quantity of minutes allowed per time period, a quantity of data consumption allowed per time period, and/or the like), and/or similar information. HSS 245 may provide this information to one or more other devices of environment 200 to support the operations performed by those devices. In some implementations, HSS 245 may receive, generate, store, process, and/or provide information related to authenticating user equipment 210. For example, HSS 245 may coordinate, with a first user equipment 210, one or more parameters used to generate a derived set of credentials for a second user equipment 210 based on an existing set of credentials associated with the first user equipment 210. Accordingly, HSS 245 may use the derived set of credentials to generate a challenge message for the second user equipment 210 and authenticate the second user equipment 210 based on a response from the second user equipment 210 matching an expected response to the challenge message.

AAA 250 includes one or more devices, such as one or more server devices, that perform authentication, authorization, and/or accounting operations for communication sessions associated with user equipment 210. For example, AAA 250 may perform authentication operations for user equipment 210 and/or a user of user equipment 210 (e.g., using one or more credentials), may control access, by user equipment 210, to a service and/or an application (e.g., based on one or more restrictions, such as time-of-day restrictions, location restrictions, single or multiple access restrictions, read/write restrictions, and/or the like), may track resources consumed by user equipment 210 (e.g., a quantity of voice minutes consumed, a quantity of data consumed, and/or the like), and/or may perform similar operations.

Network 270 includes one or more wired and/or wireless networks. For example, network 270 may include a telecommunications network (e.g., a 3G network, an LTE network, a 5G network, a code division multiple access (CDMA) network, and/or the like), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these and/or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
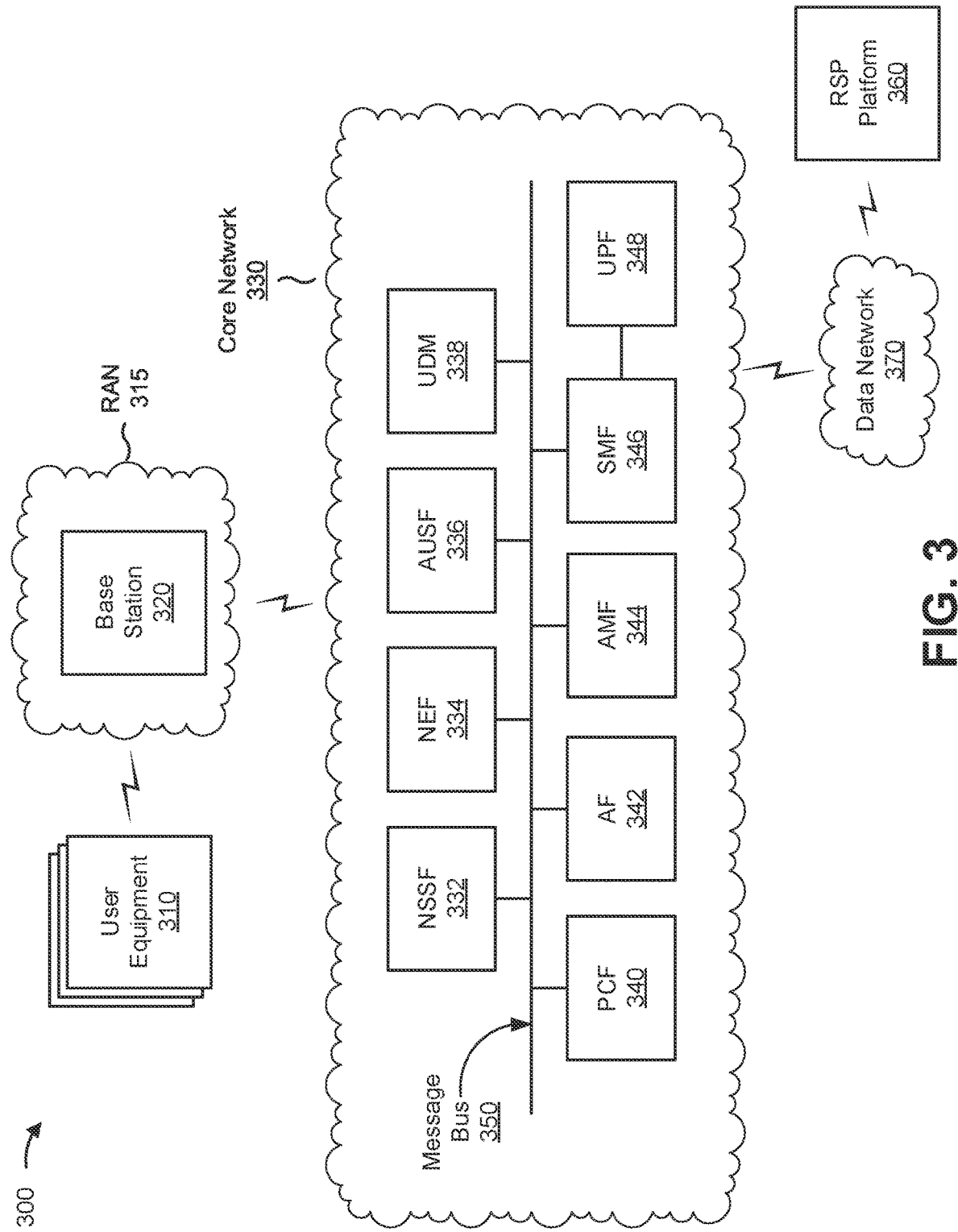
FIG. 3 is a diagram of an example environment in which systems and/or methods described herein may be implemented.

FIG. 3 is a diagram of another example environment 300 in which systems, functional architectures, and/or methods described herein can be implemented. As shown in FIG. 3, environment 300 can include a user equipment 310, a RAN 315, a base station 320, a core network 330, a remote SIM provisioning platform 360, and a data network 370. As further shown in FIG. 3, core network 330 can include, for example, a Network Slice Selection Function (NSSF) 332, a Network Exposure Function (NEF) 334, an Authentication Server Function (AUSF) 336, a Unified Data Management (UDM) function 338, a Policy Control Function (PCF) 340, an Application Function (AF) 342, an Access and Mobility Management Function (AMF) 344, a Session Management Function (SMF) 346, and a User Plane Function (UPF) 348, which can be communicatively connected via a message bus 350 that can be comprised of one or more physical communication channels and/or one or more virtual communication channels. Devices of environment 300 can interconnect via wired connections, wireless connections, or a combination of wired and wireless connections.

User equipment 310 includes one or more devices capable of communicating with base station 320 and/or a network (e.g., RAN 315). For example, user equipment 310 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, user equipment, and/or a similar device. User equipment 310 can be capable of communicating using uplink (e.g., user equipment to base station) communications, downlink (e.g., base station to user equipment) communications, and/or sidelink (e.g., user equipment-to-user equipment) communications. In some implementations, user equipment 310 can include a machine-type communication (MTC) user equipment, such as an evolved or enhanced MTC (eMTC) user equipment. In some implementations, user equipment 310 can include an Internet of Things (IoT) device (e.g., a narrowband IoT (NB-IoT) user equipment and/or the like).

In some implementations, user equipment 310 includes a first device that may generate a derived profile that a second device can use to access a wireless network subscription of the first device based on a derived set of credentials that is generated based on an existing set of credentials associated with the wireless network subscription of the first device. Additionally, or alternatively, user equipment 310 may include a device that may be provisioned with a derived profile that includes a derived set of credentials that is generated based on an existing set of credentials associated with the wireless network subscription of another device.

RAN 315 includes base station 320 and is operatively connected, via a wired and/or wireless connection, to the core network 330 through UPF 348. RAN 315 can facilitate communications sessions between user equipment 310 and data network 370 by communicating application-specific data between RAN 315 and core network 330. Data network 370 includes various types of data networks, such as the Internet, a third-party services network, an operator services network, a private network, a wide area network, and/or the like.

Base station 320 includes one or more devices capable of communicating with user equipment 310 using a cellular radio access technology (RAT). For example, base station 320 can include a base transceiver station, a radio base station, a node B, an evolved node B (eNB), a gNB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. Base station 320 can transfer traffic between user equipment 310 (e.g., using a cellular RAT), other base stations 320 (e.g., using a wireless interface or a backhaul interface, such as a wired backhaul interface), RAN 315, and/or data network 370. Base station 320 can provide one or more cells that cover geographic areas. In some implementations, base station 320 may be a mobile base station. In some implementations, base station 320 may be capable of communicating using multiple RATs.

In some implementations, base station 320 can perform scheduling and/or resource management for user equipment 310 covered by base station 320 (e.g., user equipment 310 covered by a cell provided by base station 320). In some implementations, base stations 320 can be controlled or coordinated by a network controller, which can perform load balancing, network-level configuration, and/or the like. The network controller can communicate with base stations 320 via a wireless or wireline backhaul. In some implementations, base station 320 can include a network controller, a self-organizing network (SON) module or component, and/or or the like. In other words, base station 320 can perform network control, scheduling, and/or network management functions (e.g., for other base stations 320 and/or for uplink, downlink, and/or sidelink communications of user equipment 310 covered by the base station 320).

In some implementations, base station 320 can include a central unit and multiple distributed units. The central unit can coordinate access control and communication with regard to the multiple distributed units. The multiple distributed units can provide user equipment 310 and/or other base stations 320 with access to core network 330 or data network 370. For example, in some implementations, the central unit can be a logical node that hosts RRC and PDCP protocols of base station 320, an SDAP protocol of base station 320, and/or the like. The multiple distributed units can be logical nodes that host RLC, MAC, and PHY layers of base station 320. In some implementations, one distributed unit can include one or more radios that are used to support one or multiple cells that can provide user equipment 310 and/or other base stations 320 with access to core network 330 or data network 370. Furthermore, in some implementations, the central unit can be disaggregated or otherwise split into control plane and user plane nodes. For example, the control plane node can be a logical node hosting the RRC and the control plane part of the PDCP protocol for the central unit of base station 320 while the user plane node can be a logical node that hosts the user plane part of the PDCP protocol, the SDAP protocol for the central unit of base station 320, and/or the like. In some implementations, layers and/or protocols may be flexibly split among the central unit and the distributed units.

Accordingly, as used herein, a node associated with RAN 315 (which can be referred to as a "RAN node") can include base station 320, a distributed unit of base station 320, a central unit of base station 320, a control plane part of the central unit of base station 320, a user plane part of the central unit of base station 320, and/or any suitable combination thereof.

Core network 330 can include various functional elements included in a 5G wireless telecommunications system, which can be implemented by one or more of devices (e.g., a device described below with respect to FIG. 4). While the example functional architecture of core network 330 shown in FIG. 3 can be an example of a service-based architecture, in some implementations, core network 330 can be implemented as a reference-point architecture.

As mentioned above, core network 330 can include various functional elements. The functional elements can include, for example, NSSF 332, NEF 334, AUSF 336, UDM 338, PCF 340, AF 342, AMF 344, SMF 346, and UPF 348. These functional elements can be communicatively connected via a message bus 350, which can be comprised of one or more physical communication channels and/or one or more virtual communication channels. Each of the functional elements shown in FIG. 3 is implemented on one or more devices associated with a wireless telecommunications system. In some implementations, one or more of the functional elements can be implemented on physical devices, such as an access point, a base station, a gateway, a server, and/or the like. In some implementations, one or more of the functional elements can be implemented on one or more computing devices of a cloud computing environment associated with the wireless telecommunications system. In some implementations, core network 330 can be operatively connected to RAN 315, data network 370, and/or the like, via wired and/or wireless connections with UPF 348.

NSSF 332 can select network slice instances for user equipment(s) 310, where NSSF 332 can determine a set of network slice policies to be applied at the RAN 315. By providing network slicing, NSSF 332 allows an operator to deploy multiple substantially independent end-to-end networks potentially with the same infrastructure. In some implementations, each network slice can be customized for different services. NEF 334 can support the exposure of capabilities and/or events in the wireless telecommunications system to help other entities in the wireless telecommunications system discover network services and/or utilize network resources efficiently.

AUSF 336 can act as an authentication server and support the process of authenticating user equipment 310 in the wireless telecommunications system. UDM 338 can store subscriber data and profiles in the wireless telecommunications system, generate authentication and key agreement credentials, identify users, and/or the like. UDM 338 can be used for fixed access, mobile access, and/or the like, in core network 330. In some implementations, AUSF 336 and/or UDM 338 may coordinate, with a first user equipment 310, one or more parameters used to generate a derived set of credentials for a second user equipment 310 based on an existing set of credentials associated with the first user equipment 310. Accordingly, AUSF 336 and/or UDM 338 may use the derived set of credentials to generate a challenge message for the second user equipment 310 and authenticate the second user equipment 310 based on a response from the second user equipment 310 matching an expected response to the challenge message.

PCF 340 can provide a policy framework that incorporates network slicing, roaming, packet processing, mobility management, and/or the like. AF 342 can determine whether user equipment 310 provides preferences for a set of network slice policies and support application influence on traffic routing, access to NEF 334, policy control, and/or the like. AMF 344 can provide authentication and authorization of user equipment 310. SMF 346 can support the establishment, modification, and release of communications sessions in the wireless telecommunications system. For example, SMF 346 can configure traffic steering policies at UPF 348, enforce IP address allocation and policies for user equipment 310, and/or the like. AMF 344 and SMF 346 can act as a termination point for non-access stratum (NAS) signaling, mobility management, and/or the like. SMF 346 can act as a termination point for session management related to NAS signaling. RAN 315 can send information (e.g., information that identifies user equipment 310) to AMF 344 and/or SMF 346 via PCF 340.

UPF 348 can serve as an anchor point for intra/inter radio access technology (RAT) mobility. UPF 348 can apply rules to packets, such as rules pertaining to packet routing, traffic reporting, handling user plane QoS, and/or the like. UPF 348 can determine an attribute of application-specific data that is communicated in a communications session. UPF 348 can receive information (e.g., information that identifies a communications attribute of an application) from RAN 315 via SMF 346 or an application program interface.

Message bus 350 represents a communication structure for communication among the functional elements. In other words, message bus 350 can permit communication between two or more functional elements. Message bus 350 can be a message bus, HTTP/2 proxy server, and/or the like.

The number and arrangement of functional elements in core network 330 are provided as one or more examples. In practice, core network 330 can have additional functional elements, fewer functional elements, different functional elements, or differently arranged functional elements than those shown in FIG. 3. Furthermore, two or more functional elements in core network 330 can be implemented within a single device, or a single functional element in core network 330 can be implemented as multiple, distributed devices. Additionally, or alternatively, a set of functional elements (e.g., one or more functional elements) of core network 330 can perform one or more functions described as being performed by another set of functional elements of core network 330.

RSP platform 360 includes one or more devices, such as one or more server devices, capable of receiving, generating, storing, processing, and/or providing information that relates to remotely provisioning user equipment 310 with a profile for accessing and communicating over the wireless telecommunications system, as described in further detail elsewhere herein. For example, RSP platform 360 may include a Subscription Manager Data Preparation (SM-DP) device, a Subscription Manager Secure Routing (SM-SR) device, a Subscription Manager Data Preparation Plus (SM-DP+) device, and/or the like.

Data network 370 can include various types of data networks, such as the Internet, a third-party services network, an operator services network, a private network, a wide area network, and/or the like. In some implementations, data network 370 can include one or more application servers configured to support one or more applications associated with a session at the user equipment(s) 310. Furthermore, in some implementations, data network 370 can include one or more application servers that are deployed at an edge of RAN 315, with such application server(s) co-located with one or more nodes that are associated with RAN 315 (e.g., one or more distributed and/or central units associated with base station 320) and/or one or more nodes associated with core network 330 (e.g., UPF 348).

The number and arrangement of devices and networks shown in FIG. 3 are provided as one or more examples. In practice, there can be additional devices and/or networks, fewer devices and/or networks, different devices and/or networks, or differently arranged devices and/or networks than those shown in FIG. 3. Furthermore, two or more devices shown in FIG. 3 can be implemented within a single device, or a single device shown in FIG. 3 can be implemented as multiple, distributed devices. Additionally, or alternatively, a set of devices (e.g., one or more devices) of environment 300 can perform one or more functions described as being performed by another set of devices of environment 300.

Figure 4:
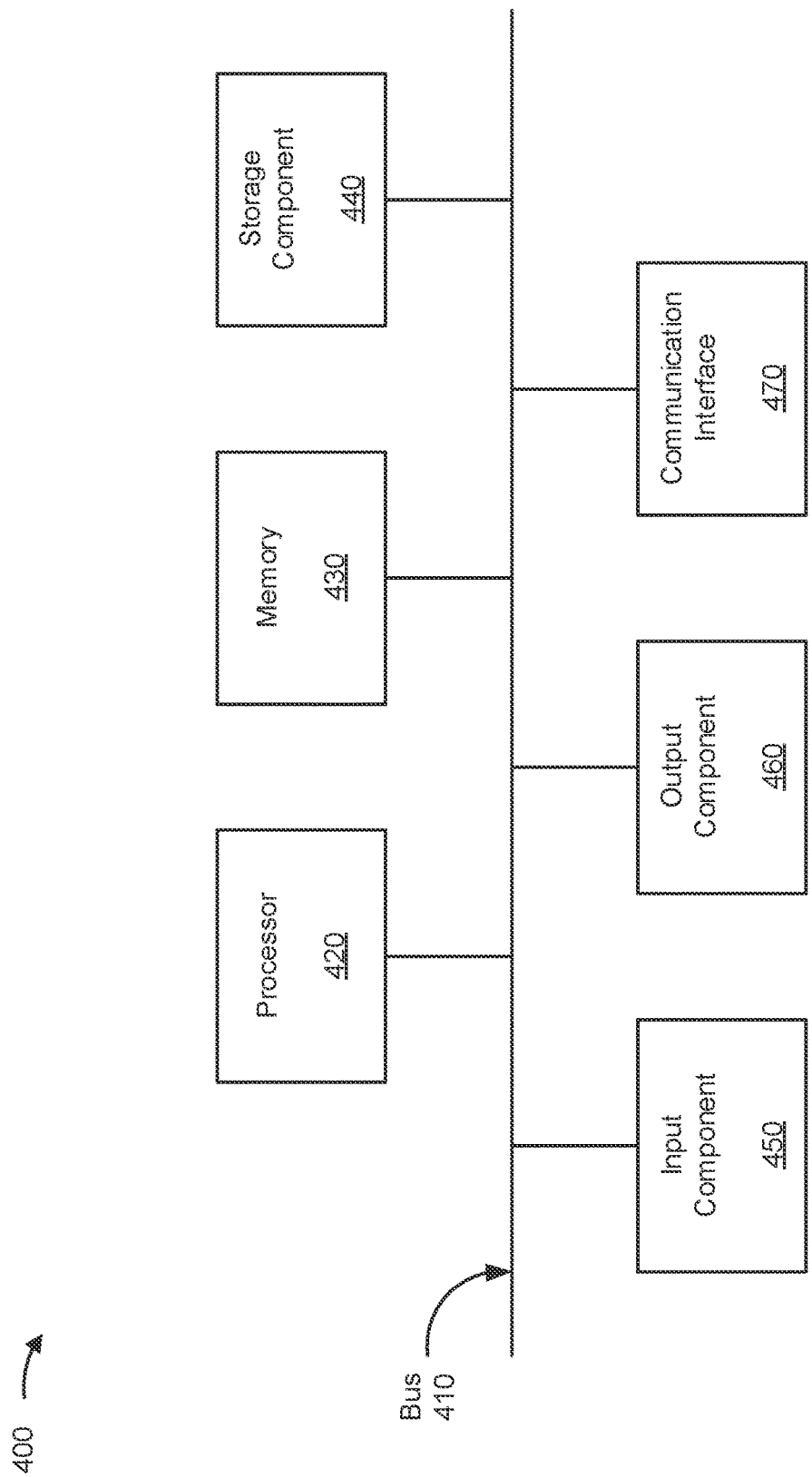
FIG. 4 is a diagram of example components of one or more devices of FIGS. 2-3.

FIG. 4 is a diagram of example components of a device 400. Device 400 may correspond to user equipment 210, base station 220, MME 230, SGW 235, PGW 240, HSS 245, AAA 250, RSP platform 260, user equipment 310, base station 320, NSSF 332, NEF 334, AUSF 336, UDM 338, PCF 340, AF 342, AMF 344, SMF 346, UPF 348, and/or RSP platform 360. In some implementations, user equipment 210, base station 220, MME 230, SGW 235, PGW 240, HSS 245, AAA 250, RSP platform 260, user equipment 310, base station 320, NSSF 332, NEF 334, AUSF 336, UDM 338, PCF 340, AF 342, AMF 344, SMF 346, UPF 348, and/or RSP platform 360 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
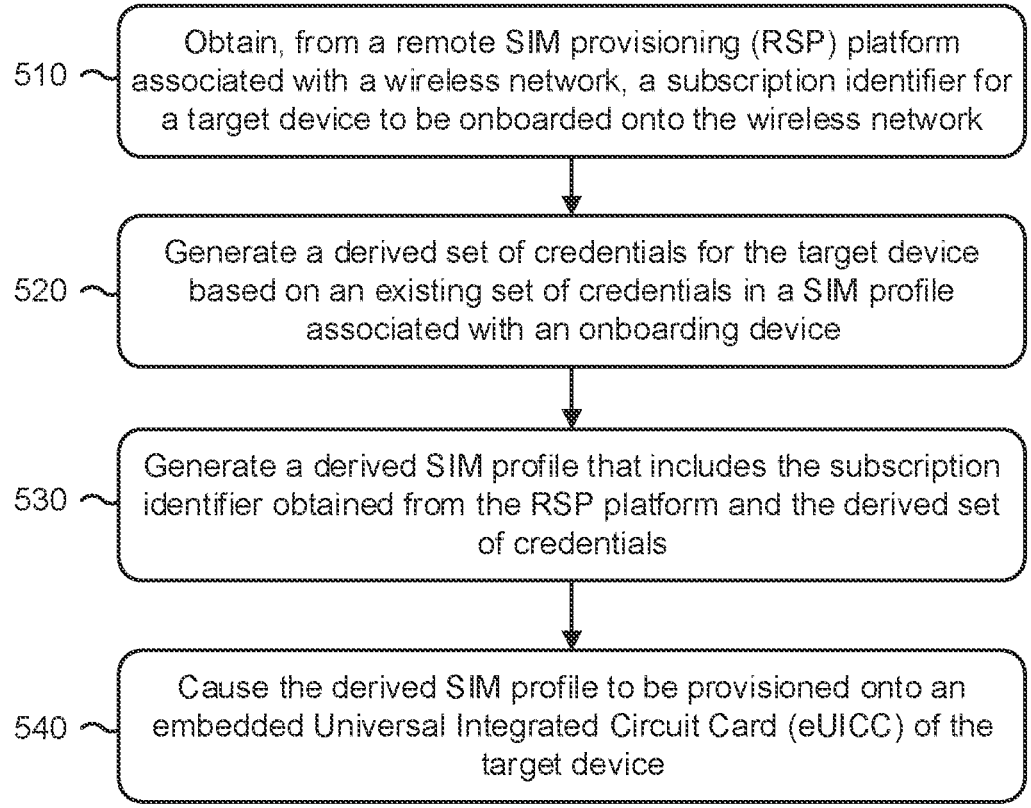
FIG. 5 is a flow chart of an example process for deriving a profile for a target endpoint device.

FIG. 5 is a flow chart of an example process 500 for deriving a profile for a target endpoint device. In some implementations, one or more process blocks of FIG. 5 may be performed by a device, which may be a user equipment (UE) (e.g., user equipment 210, user equipment 310). In some implementations, the device that performs one or more process blocks of FIG. 5 can be another device or a group of devices separate from or including the user equipment, such as a base station (e.g., base station 220, base station 320), a core network element (e.g., MME 230, SGW 235, PGW 240, HSS 245, AAA 250, NSSF 332, NEF 334, AUSF 336, UDM 338, PCF 340, AF 342, AMF 344, SMF 346, UPF 348, and/or the like), a remote SIM provisioning (RSP) platform (e.g., RSP platform 260, 360), and/or the like.

As shown in FIG. 5, process 500 may include obtaining, from a remote SIM provisioning (RSP) platform associated with a wireless network, a subscription identifier for a target device to be onboarded onto the wireless network (block 510). For example, the device (e.g., using processor 420, memory 430, storage component 440, input component 450, output component 460, communication interface 470, and/or the like) may obtain a subscription identifier for a target device to be onboarded onto a wireless network from a remote SIM provisioning (RSP) platform associated with the wireless network, as described above.

In some implementations, the device may obtain the subscription identifier from a pool of subscription identifiers that are used to share subscriptions associated with the wireless network (e.g., based on a request to share a subscription of the device with the target device). In some implementations, the subscription identifier obtained for the target device may be made available for subsequent use by another device based on the device disassociating from the target device As further shown in FIG. 5, process 500 may include generating a derived set of credentials for the target device based on an existing set of credentials in a SIM profile associated with the device (block 520). For example, the device (e.g., using processor 420, memory 430, storage component 440, input component 450, output component 460, communication interface 470, and/or the like) may generate a derived set of credentials for the target device based on an existing set of credentials in a SIM profile associated with the device, as described above.

In some implementations, the derived set of credentials may include one or more authentication vectors that are generated according to a derivation algorithm based on one or more parameters that are coordinated with the authentication device associated with the wireless network. For example, the one or more parameters that are coordinated with the authentication device may include a seed (e.g., a cryptographic salt) that the device and the authentication device use as an input to the derivation algorithm to independently generate the derived set of credentials. Furthermore, to coordinate the one or more parameters, the device and the authentication device may communicate over the wireless network to establish the seed to be used as the input to the derivation algorithm. Additionally, or alternatively, the device and the authentication device may independently select the seed to be used as the input to the derivation algorithm (e.g., based on the subscription identifier obtained for the target device, the existing set of credentials in the SIM profile associated with the device, a random number scheme, and/or the like).

As further shown in FIG. 5, process 500 may include generating a derived SIM profile that includes the subscription identifier obtained from the RSP platform and the derived set of credentials (block 530). For example, the device (e.g., using processor 420, memory 430, storage component 440, input component 450, output component 460, communication interface 470, and/or the like) may generate a derived SIM profile that includes the subscription identifier obtained from the RSP platform and the derived set of credentials, as described above. Furthermore, in some implementations, the derived SIM profile may also include an eUICC identifier (eID) associated with the eUICC of the target device.

As further shown in FIG. 5, process 500 may include causing the derived SIM profile to be provisioned onto an embedded Universal Integrated Circuit Card (eUICC) of the target device (block 540). For example, the device (e.g., using processor 420, memory 430, storage component 440, input component 450, output component 460, communication interface 470, and/or the like) may cause the derived SIM profile to be provisioned onto an eUICC of the target device, as described above. In some implementations, the derived SIM profile may enable the target device to obtain access to the wireless network by using the derived set of credentials to generate a response to an authentication challenge from an authentication device associated with the wireless network.

In some implementations, when causing the derived SIM profile to be provisioned onto the eUICC of the target device, the device may receive, from the RSP platform, an encryption key for the derived SIM profile based on a public key of the target device, encrypt a package that includes the derived SIM profile and the encryption key for the derived SIM profile using the public key of the target device, and transmit the package to the target device. Accordingly, the target device may use a private key associated with the public key of the target device to decrypt the package and install the SIM profile on the eUICC.

Additionally, or alternatively, when causing the derived SIM profile to be provisioned onto the eUICC of the target device, the device may transmit a public key of the target device to the RSP platform and further transmit the derived SIM profile to the RSP platform. Accordingly, the RSP platform may use the public key of the target device to generate an encryption key for the derived SIM profile and to encrypt a package that includes the derived SIM profile and the encryption key for the derived SIM profile, and the device may provide, to the target device, information enabling the target device to download the package from the RSP platform and install the derived SIM profile on the eUICC.

Process 500 may include additional implementations, such as any single implementation or any combination of implementations described above and/or in connection with one or more other processes described elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   obtaining, by an onboarding device, a subscription identifier for a target device to be onboarded onto a wireless network;
   generating, by the onboarding device and according to a key derivation function, a derived set of credentials based on an existing set of credentials associated with the onboarding device;
   generating, by the onboarding device, a derived subscriber identification module (SIM) profile that includes the subscription identifier and the derived set of credentials; and
   causing, by the onboarding device, the derived SIM profile to be provided to the target device to enable the target device to obtain access to the wireless network by using the derived set of credentials.

2. The method of claim 1, wherein the onboarding device is a first user equipment, and the target device is a second user equipment.

3. The method of claim 1, wherein the method further comprises:
   receiving a request to activate data service for the target device from a user having a subscription with a particular mobile network operator (MNO).

4. The method of claim 1, wherein the derived set of credentials include one or more authentication vectors that are generated according to the key derivation function.

5. The method of claim 1, wherein the subscription identifier is made available for subsequent use by another device based on the onboarding device disassociating from the target device.

6. The method of claim 1, wherein the subscription identifier is obtained based on a request to temporarily share a subscription, associated with a particular mobile network operator (MNO), with the target device.

7. An onboarding device, comprising:
   a memory; and
   one or more processors, coupled to the memory, and configured to:
     obtain a subscription identifier for a target device to be onboarded onto a wireless network;
     generate, using a key derivation function, a derived set of credentials based on an existing set of credentials associated with the onboarding device;
     generate a derived subscriber identification module (SIM) profile that associates the subscription identifier with the derived set of credentials; and
     cause the derived SIM profile to be provided to the target device to enable the target device to obtain access to the wireless network.

8. The onboarding device of claim 7, wherein the derived SIM profile enables the target device to obtain access to the wireless network by using the derived set of credentials to respond to an authentication challenge from an authentication device associated with the wireless network.

9. The onboarding device of claim 7, wherein the derived set of credentials is generated according to the key derivation function further based on one or more parameters that are coordinated with an authentication device associated with the wireless network.

10. The onboarding device of claim 9, wherein the one or more parameters that are coordinated with the authentication device include a seed used as an input to the key derivation function.

11. The onboarding device of claim 10, wherein the one or more processors are further to:
communicate with the authentication device over the wireless network to establish the seed to be used as the input to the key derivation function.

12. The onboarding device of claim 10, wherein the one or more processors are further to:
select the seed to be used as the input to the key derivation function based on a random number scheme that is coordinated with the authentication device.

13. The onboarding device of claim 7, wherein the subscription identifier is made available for subsequent use by another device based on the onboarding device disassociating from the target device.

14. A non-transitory computer-readable medium storing instructions, the instructions comprising:
one or more instructions that, when executed by one or more processors of an onboarding device, cause the one or more processors to:
obtain a subscription identifier for a target device to be onboarded onto a wireless network;
generate, according to a key derivation function, a derived set of credentials based on an existing set of credentials associated with the onboarding device;
generate a derived subscriber identification module (SIM) profile that includes the subscription identifier and the derived set of credentials; and
cause the derived SIM profile to be provided to the target device to enable the target device to obtain access to the wireless network by using the derived set of credentials.

15. The non-transitory computer-readable medium of claim 14, wherein the key derivation function is coordinated with an authentication device that is associated with the wireless network.

16. The non-transitory computer-readable medium of claim 14, wherein the derived SIM profile enables the target device to obtain access to the wireless network by using the derived set of credentials to generate a response to an authentication challenge from an authentication device associated with the wireless network.

17. The non-transitory computer-readable medium of claim 16, wherein the subscription identifier is obtained from a pool of subscription identifiers that includes a set of subscription identifiers reserved for the onboarding device for temporarily sharing a subscription, associated with a particular mobile network operator (MNO), of the onboarding device.

18. The non-transitory computer-readable medium of claim 17, wherein the one or more instructions further cause the one or more processors to:
receive a request to activate data service for the target device from a user having the subscription with the particular MNO; and
wherein the pool of subscription identifiers are available to subscribers of the particular MNO.

19. The non-transitory computer-readable medium of claim 14, wherein a cryptographic salt is used as an input to the key derivation function to generate the derived set of credentials based on the existing set of credentials.

20. The non-transitory computer-readable medium of claim 14, wherein the subscription identifier is made available for subsequent use by another device based on the onboarding device disassociating from the target device.

* * * * *